Figure 1:
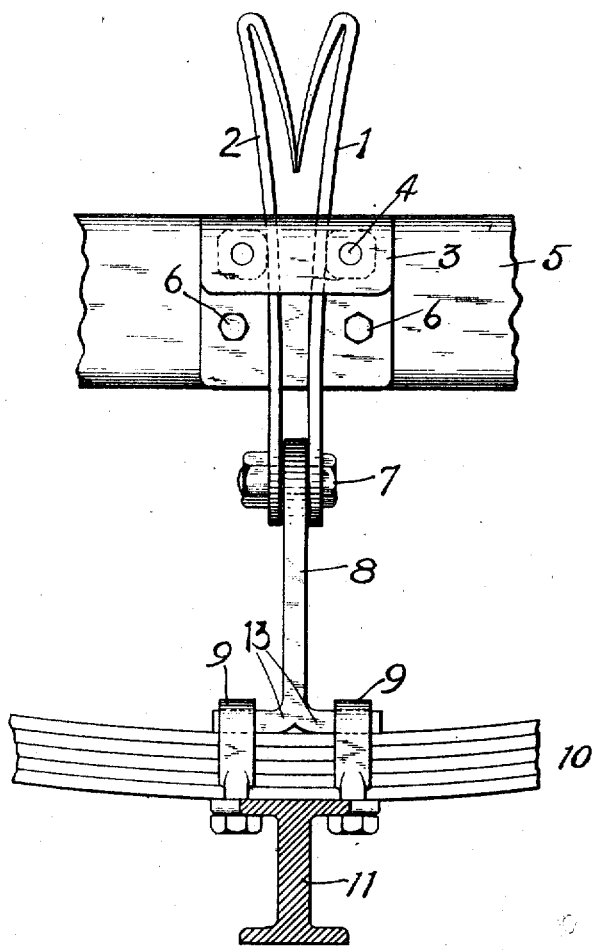

G. E. SHIPPEY.
SHOCK ABSORBER.
APPLICATION FILED JULY 22, 1908.

930,498.

Patented Aug. 10, 1909.

WITNESSES:
Wm H. Jones
C. M. Wilcox

INVENTOR.
George E. Shippey.
BY
Jno. F. Whitney.
ATTORNEY.

UNITED STATES PATENT OFFICE.

GEORGE E. SHIPPEY, OF PITTSFIELD, MASSACHUSETTS.

SHOCK-ABSORBER.

No. 930,498.    Specification of Letters Patent.    Patented Aug. 10, 1909.

Application filed July 22, 1908. Serial No. 444,733.

*To all whom it may concern:*

Be it known that I, GEORGE E. SHIPPEY, a citizen of the United States, residing at Pittsfield, in the county of Berkshire and State of Massachusetts, have invented certain new and useful Improvements in Shock-Absorbers for Spring-Vehicles, of which the following is a specification.

This invention relates to devices for opposing resilient resistance to the violent or undue oscillation of the spring-supported portion of moving vehicles, and has for its particular object improved means for relieving the carriage-springs from the shock and strain of excessive agitation resulting from rough travel or otherwise.

The invention comprises principally oppositely disposed strips of resilient metal constructed to form a compressible wedge inserted between stationary pins or rollers, and appropriate means for the coöperation and separate support of these parts.

Reference is to be had to the accompanying drawings, forming a part of this specification, in which corresponding parts are indicated by similar reference characters in each of the views.

Figure 2:
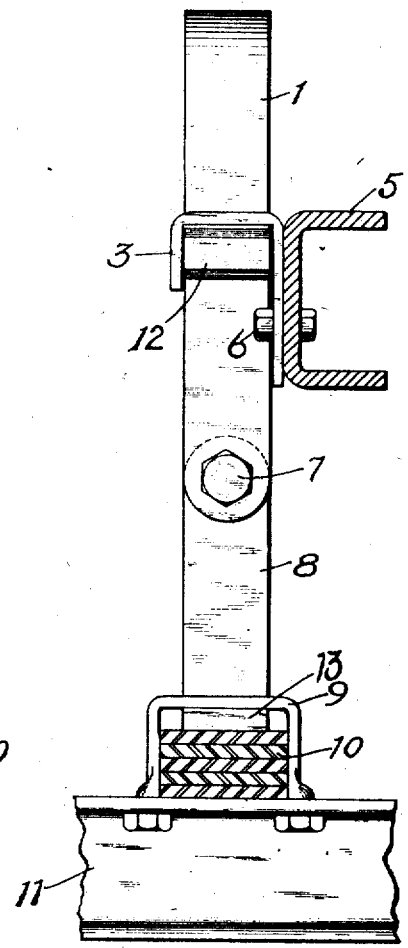
Figure 4:
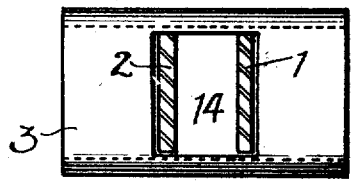
Figure 3:
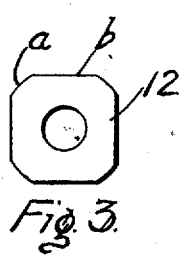

Figure 1 is a side elevation of sections of a vehicle, presenting an edge view of a device, constructed in accordance with the preferred form of my invention, applied thereon. Fig. 2 represents the parts shown in Fig. 1 in reversed position. Fig. 3 is a detail end view of the pin or roller 12; and Fig. 4 is a detail top view of the holder 3, showing the opening therein through which are projected the springs 1 and 2, in section.

Referring to the drawings, 11 indicates the axle of the carriage-portion, or underbody of the vehicle, upon which the springs 10 for supporting the overbody, or relatively movable portion, rest.

9 indicates a pair of bridge clamps bolted to the axle and holding the carriage-springs in position thereon.

8 indicates an upright support for the springs 1 and 2 of my device which are secured at their lower ends to opposite faces of the support at the top thereof by means of a bolt 7, projected through coincident apertures provided in the several parts. The support 8 is constructed of a flat, inflexible piece of metal firmly secured at its lower end to the underbody of the vehicle, preferably by means of the feet 13 provided on either side thereof and projected between the bows of the clamps 9 and the springs 10.

5 represents a section of the frame supporting the overbody to which a holder 3, for the support of the rollers 12, is attached by means of bolts 6 projected through coincident apertures provided in the frame and holder. The holder is preferably of a piece of sheet metal bent so as to resemble in edge view an inverted letter J, comprising a horizontally projecting flange at the top provided centrally with an opening 14 sufficiently large to admit of the springs 1 and 2 projecting freely therethrough, and a free edge depending from the said flange so as to form a facing parallel to the body-portion of the holder. Between said free edge and the body-portion of the holder are provided parallel rollers 12 adapted to bear upon the exterior facings of the springs 1 and 2 and mounted upon bearing-pins 4 which are secured to opposite sides of the holder through apertures provided therein. Said rollers are each constructed with four flat faces $b$ and rounded corners $a$.

The springs 1 and 2 each consist of an elongated strip of resilient metal secured at the lower end to the upright support 8 in the manner aforesaid and projected upward through the opening 14 provided in the top of the holder. The free ends of the springs are bent inward and downward at an acute angle, the tips being somewhat tapered to afford greater resiliency and adapted to bear movably against each other. This construction forces the free ends of the springs apart, causing the springs to be compressed centrally by the stationary rollers 12.

As it has been found by experience that the efficiency of shock absorbers of the class referred to is chiefly in relieving the rebound of the overbody of the vehicle it will be observed that the springs of my device diverge chiefly from a central point upward. A slight divergence, however, is intended to be given to the springs from a central point downward, sufficient to resist, in coöperation with the usual carriage-springs, the downward movements of the overbody. This latter effect may be increased by the insertion of a washer between the lower ends of the springs and the support 8.

It may be observed that only one face of each roller is opposed at any given time to the wear incident to friction of the sliding spring, and that the roller is rotated upon its bearing when desired by manual means but is normally substantially stationary.

It is apparent that the size and strength of the parts composing my device are proportioned to the weight and use of the vehicle to which it is applied, while slight modifications of the preferred form of construction described in this specification may be made without departing from the spirit of my invention.

From the foregoing description it is deemed that the operation of the device will be apparent.

Having fully described my invention, I claim as new, and desire to secure by Letters Patent, the following:—

1. A shock absorber comprising separate, oppositely disposed resilient members, means, provided independently of said members, for the support and spacing thereof, separate means providing a resilient contact of the members at one of the ends thereof, and means provided independently of the foregoing for automatically applying pressure to the said resilient members, thereby producing a retarding effect upon the relative movements of the parts of the vehicle.

2. In a vehicle having a progressive underbody and a superposed part movably supported thereon, a shock absorber comprising a wedge-shaped member composed of separate, oppositely-disposed, coöperative springs secured to one of the above-mentioned parts of the vehicle, means, provided independently of said wedge-shaped member, for adjusting the springs thereof at their converging ends and holding the same in fixed, spaced relation, and separate stationary members secured to the other of said parts of the vehicle and adapted to engage and automatically compress the sides of said wedge-shaped member, thereby producing a retarding effect upon the relative movements of the parts of the vehicle.

3. In shock absorbers, a wedge-shaped member comprising oppositely disposed springs secured together at corresponding ends, each of said springs being provided at the opposite ends thereof with inturned resilient arms adapted to bear yieldingly against each other, and stationary members adapted to compress the sides of said wedge-shaped member moving relatively thereto.

4. In shock absorbers, a wedge-shaped resilient member and separate independently-supported stationary rollers each provided with four flat faces and adapted to engage and automatically compress the sides of said first-mentioned member moving relatively thereto.

5. In vehicles, the combination with a progressive underbody, a separate relatively movable overbody, and carriage-springs for the support of the overbody, of a rigid upright support secured to one of said bodies of the vehicle, a separate resilient wedge-shaped member attached to said upright support, stationary parallel members provided with flat-bearing surfaces on either side of said wedge-shaped member and adapted to compress the same moving relatively thereto, and means for the support of said wedge-compressing members to the other of said bodies of the vehicle.

6. Retarding means, for the purpose described, comprising fixed spaced members moving relatively to and adapted to compress interposed resilient longitudinally-extended members having a resilient contact relation at one of their ends and a fixed relation at the other of their ends.

7. Retarding mechanism, for the purpose described, comprising oppositely - disposed longitudinally - extended resilient members having a resilient contact at one of their ends and a fixed relation at the other of their ends, and means supported independently of said members for applying increasing pressure upon the resilient ends thereof in opposition to the longitudinal movements of the same.

8. A shock absorber for the purpose described comprising oppositely-disposed longitudinally-extended resilient members having a fixed spaced relation at one of their ends and diverging outwardly at the other of their ends, auxiliary means yieldingly spreading the said diverging ends, and separate means adapted to compress the said diverging ends when moved relatively thereto.

9. In shock absorbers, the combination with a support, oppositely-disposed longitudinally-extended resilient members secured to the support, and means for spacing said members, of separate independently supported rotatable members fixed relatively to each other and provided with a plurality of wearing faces, said rotatable members being adjusted to coöperate with the said resilient members in such manner as to oppose the longitudinal movements thereof.

In testimony whereof I hereunto affix my signature in presence of two witnesses.

GEORGE E. SHIPPEY.

Witnesses:
THOMAS N. ENRIGHT,
W. A. CROSSMAN.